GEOFFREY J. CRANK
GEOFFREY W. EASTWOOD
INVENTORS

BY Hall & Houghton
ATTORNEY

GEOFFREY J. CRANK
GEOFFREY W. EASTWOOD
INVENTORS

BY Hall & Houghton

ATTORNEY

GEOFFREY J. CRANK
GEOFFREY W. EASTWOOD
INVENTORS
BY Hall & Houghton
ATTORNEY

GEOFFREY J. CRANK,
GEOFFREY W. EASTWOOD
INVENTORS

BY Hall & Houghton

ATTORNEY

United States Patent Office 3,452,343

Patented June 24, 1969

3,452,343

MAGNETIC MARKING OF FERROMAGNETIC ARTICLES

Geoffrey James Crank, New Barnet, and Geoffrey Wallwork Eastwood, London, England, assignors to Her Majesty's Postmaster General, St. Martin's-le-Grand, London, England Filed Sept. 14, 1964, Ser. No. 396,160
Claims priority, application Great Britain, Sept. 17, 1963, 36,620/63
Int. Cl. G01r *33/12;* G11b *5/74*
U.S. Cl. 340—174.1 11 Claims

ABSTRACT OF THE DISCLOSURE

Marking an elongated ferromagnetic article at a selected point by inducing two successive, oppositely directed magnetic regions which extend lengthwise of the article so that the selected point lies between the adjacent like poles of the regions. The selected point, once marked, may be detected by measuring the component of the external field of the regions in a direction longitudinally of the article and, if desired, simultaneously and separately measuring the component in a direction transversely of the article. The use of fluxgate magnetometers for such detection is described.

Figure 1:
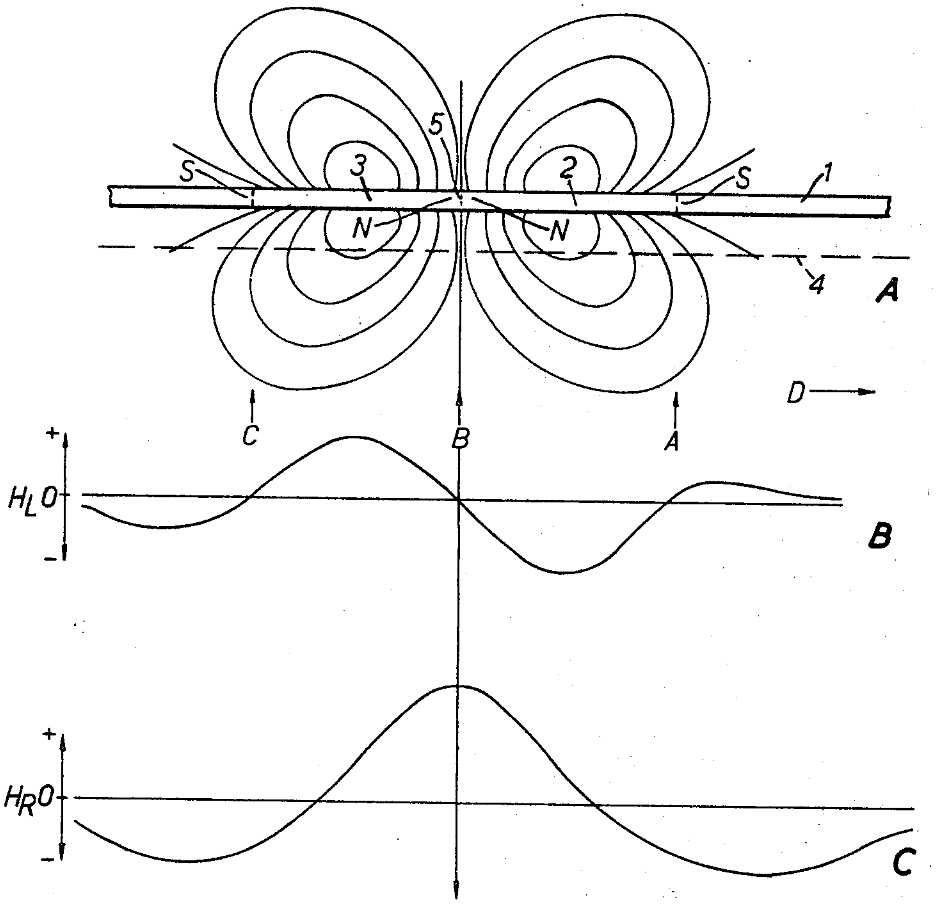

This invention relates to marking of ferromagnetic articles, e.g. rods, tubes, wires or cables.

It is sometimes required to mark an elongated article at selected points along its length and the making of material marks may be inconvenient or undesirable. If the article is made of ferromagnetic material then it may be magnetised at the selected points and the magnetic marks may be detected when required; however, the accuracy of such markings is not always as precise as is sometimes required.

According to the present invention, a method of marking an elongated ferromagnetic article at one or more selected points along the length thereof, comprises inducing in the vicinity of each such point and extending lengthwise of the article, two successive, adjacent, oppositely directed magnetic regions having longitudinal and radial components of external field i.e. components which extend longitudinally and transversely of the article, the point to be marked being defined between the adjacent like poles of the two magnetic regions.

The invention also includes a method of marking an elongated ferromagnetic article, for example a submarine cable having a ferromagnetic core, at one or more selected points along the length thereof by inducing in the vicinity of each such point and extending lengthwise of the article, two successive, dipolar magnetic regions having contiguous like poles, the point to be marked being defined by the junction of the contiguous like poles of the two regions.

Preferably, each magnetic region is of such length that the demagnetising field it produces is small compared to the coercivity of the ferromagnetic article.

The magnetic regions of each pair can be induced simultaneously or successively. When induced simultaneously the article can be exposed to a composite magnetic field consisting of two adjacent oppositely directed magnetic fields each of which induces in the article one of the pair of magnetic regions. When induced successively the article can be passed through a magnetic field to induce, in advance of the selected point, one region and then the magnetic field is reversed to induce the other region directly following the selected point. The magnetic fields may be provided by solenoids or electromagnets and the switching on and off of the inducing field should be such that sharply defined pole ends of the magnetic regions are obtained.

Between the two adjacent magnetic regions, the longitudinal component of the magnetic field produced by the regions passes through a zero value whilst the transverse component exhibits a flat maximum at this point. In the unmagnetised regions of the article adjacent the magnetised regions, both the longitudinal and transverse components fall to a small value, the longitudinal component again passing through a zero value at the junction between the magnetised and unmagnetised regions. Detection of the junction between two contiguous oppositely poled regions may be effected in accordance with the invention by means responsive only to the longitudinal component of the field of the magnetic regions and arranged to produce an output signal upon detection of a zero longitudinal component only when that component changes in polarity between the two magnetic regions. For such detection amplitude limiting and differentiation techniques are used in order accurately to detect the change in polarity between the two magnetic regions. The junction between a pair of such magnetic regions also may be detected, in accordance with the invention, by means simultaneously and separately responsive to the longitudinal and transverse components of the magnetic regions and the responsive means may be arranged to produce an output signal upon simultaneous detection of a zero longitudinal component and a transverse component of the magnetic field exceeding a predetermined value.

The invention may be utilised during the manufacture of so-called lightweight cable having a centre conductor formed of steel strands surrounded by a sheath of copper strip joined along its length by a continuous seam, the sheath subsequently being coated with a dielectric material, for example polythene, conveniently by an extrusion process. An example of such a cable, utilising an unwelded seam for the copper sheath, is described in greater detail in the specification of British Patent No. 730,782; however, the unwelded seam may be replaced, for example, by a continuously welded seam. Occasionally faults occur in this welded seam which may be detected electrically, for example by use of a bridge, the balance of which indicates the presence of a fault and may be utilised to provide a visual or aural indication of the fault and to actuate apparatus for marking the fault in accordance with the present invention. Faults in the copper sheath which may be detected include seam weld skips, pin-holes, copper cracks, inclusions and faulty cross-welds between adjacent lengths of the copper tape of the sheath. Upon detection of such a fault on the inner conductor production line, the line may be stopped and the suspect area examined. Normally the fault is visible and can be repaired immediately. However, occasionally the fault may be too serious for immediate repair and sometimes no fault is visible. In all these cases marking of the faulty or suspect region is desirable since any repair may subsequently fail, serious faults require remedial action at a later stage in manufacture and invisible faults may give rise to trouble at later stages in manufacture. During extrusion of the dielectric material around the inner conductor air trapped within the conductor expands and may escape through such faults in the copper sheath and blow holes in the dielectric. If faulty areas are marked, the dielectric may be lanced in the region of the faults and the void confined to a small area which may be subsequently repaired, as by a moulding operation. Sometimes such voids occur which do not completely blow out and are difficult subsequently to locate and repair. Thus, it will be appreciated that accurate marking of such faulty or suspect areas is desirable and the use of a magnetic mark is preferable to a material mark which if applied to the inner conductor may lead to contamination of the dielectric material and require re-application after the extrusion process. The present invention provides a means of accurately marking such faults in a manner which can be effected on the inner conductor production line or on the extrusion line prior to the extruder, the mark once made being unaffected by the extrusion process.

Apart from the use described above, the invention may be utilised to apply accurately spaced reference marks along the length of an elongated ferromagnetic article, location accuracies of the order of 0.1 inch being possible. This can be achieved by employment of the well known mark-detect reciprocating principle, using the distance between marker and detector as an accurate unit of length and arranging for operation of the indicator at the detection of a mark to transmit a signal for application of the next mark. This technique is very appropriate to submarine cable manufacture. Successive points on an article may be coded, for example in binary form, the presence of a mark made according to the invention representing a binary digit 1 and the absence of such a mark the binary digit 0. Alternatively, coding may be achieved by varying the interval between successive marks. Other uses include the application of mile markers and repeater location warning markers both on lightweight and armoured cables. Further, magnetic marking of a completed cable could be combined with automatic warning systems to indicate the proximity of repeaters, equalisers and cable splices during laying operations. Automatic warning systems are to be preferred to visual inspection methods particularly at night and in adverse weather conditions. Such marks may also be utilised during manufacture of the cable in the automatic indication of section cutting positions with coding to identify the sections.

In addition, magnetic marks made in accordance with the invention on a submarine cable which is subsequently laid may be detected from the sea-surface and the path of such cable may be traced from the surface by drawing along the path of the cable suitable mark-sensing equipment, e.g. that described hereinafter in connection with FIG. 7. By use of suitable coding of magnetic marks on particular cables, the paths of individual cables may readily be traced in areas where two or more cables have been laid.

Magnetic marking may also be employed in the laying of submarine cable by the so-called "taut-wire" method to enable greater control to be exercised over the amount of "slack" payed out. A description of the "taut-wire" method of submarine cable laying is to be found in a paper by E. E. Zajac entitled "Dynamics and Kinematics of the Laying and Recovery of Submarine Cable" published in the Bell System Technical Journal of September 1957.

The magnetic regions may be erased by application of a suitable demagnetising field.

By way of example, the invention will be described in greater detail with reference to the accompanying drawings, in which:

FIGURES 1A, B and C together illustrate diagrammatically an elongated ferromagnetic article having two oppositely poled contiguous magnetic regions, and variations of the longitudinal and radial components of the fields of the two regions.

Figure 2:
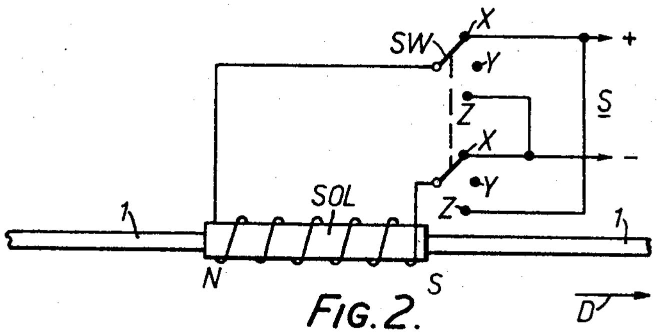
Figure 3:
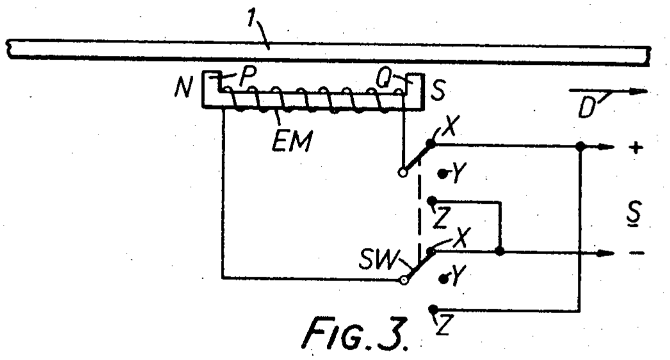
Figure 4:
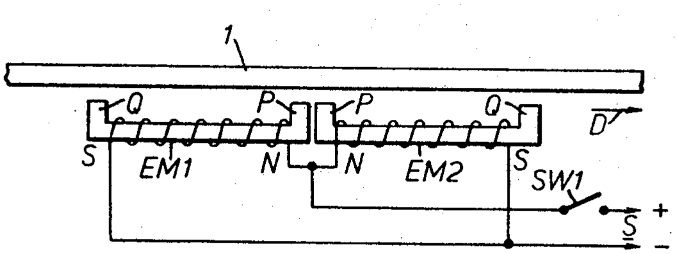
Figure 5:
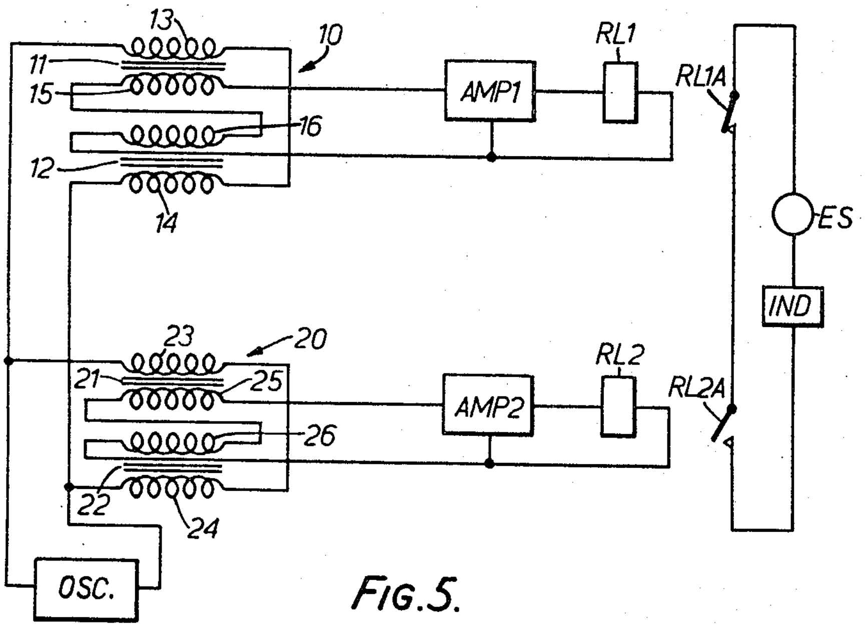
Figure 6:
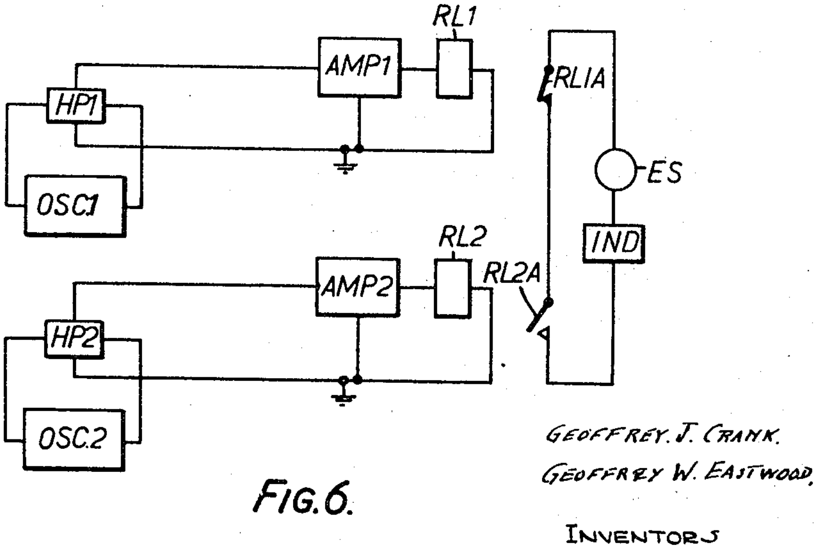
Figure 7:
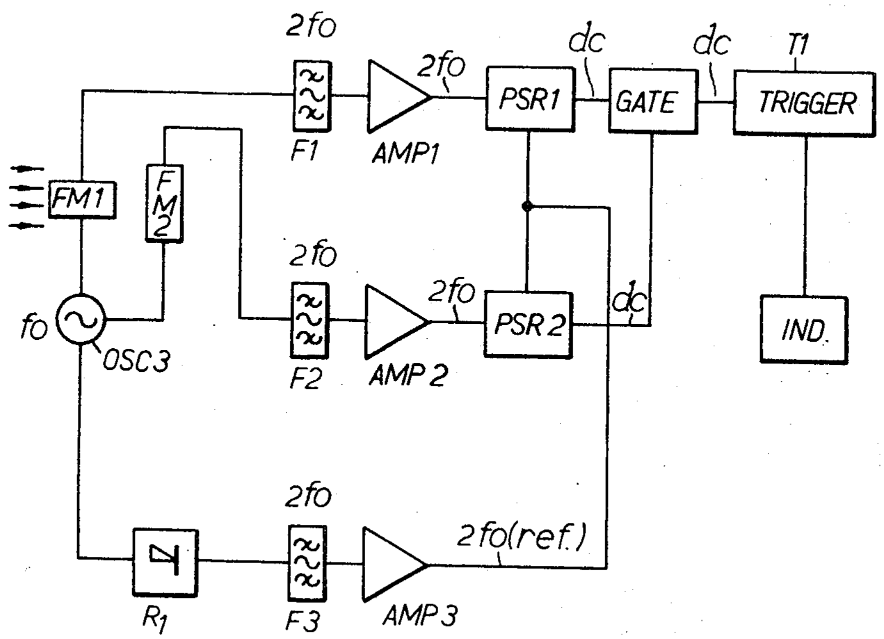

FIGS. 2, 3 and 4 show schematically apparatus for forming magnetic regions, as illustrated by FIG. 1, at selected points along the length of an elongated ferromagnetic article, and FIGS. 5, 6 and 7 show schematically apparatus for detecting both the longitudinal and radial components of such magnetic regions.

FIG. 1A shows an elongated ferromagnetic article 1 having induced therein, lengthwise thereof, two contiguous oppositely poled magnetic regions 2 and 3, the external magnetic fields produced by those regions being illustrated by so-called magnetic lines of force. The external magnetic field of each region has longitudinal and transverse components, the variation of the longitudinal component along the lengths of the regions being indicated by FIG. 1B and that of the transverse component by FIG. 1C, the axis of reference being indicated by the line 4 in FIG. 1A, i.e. referring to FIG. 1A, the longitudinal direction being along the length of article 1, the radial or transverse direction being perpendicular thereto, and the measurements plotted in FIG. 1B and FIG. 1C being taken in the space adjacent to the article 1 at the location indicated by the line 4 in FIG. 1A.

It can be seen from FIG. 1B that at the junction 5 between the contiguous regions 2 and 3, the longitudinal component of the magnetic field passes through zero as it does also at the junctions of the regions 2 and 3 with the unmagnetised regions on either side of those regions. FIG. 1C shows that at the junctions 5, the radial component of the magnetic field exhibits a flat maximum whilst, at the junction of the regions 2 and 3 with the adjacent unmagnetised regions of the article 1, the radial component is decreasing toward a minimum value smaller in magnitude than that of the maximum at the junction 5. This difference is manner of variation of the longitudinal and radial components of the external magnetic field provides a means of detecting the junction 5, as will be described later.

The length of each of the magnetized regions 2 and 3 is chosen such that the demagnetising field produced by that region is small compared to the coercivity of the article 1. Assuming that the article 1 is of circular cross-section, having a coercivity of 15 oersteds and a remanence of 12,000 gauss, the demagnetising factor of each region should be less than 0.00125. From the graphs appearing on page 846 of the book "Ferromagnetism" by R. M. Bozorth (published 1951), it can be deduced that under these conditions, the ratio of the length of each of the regions 2, 3 to the diameter of the article, should be between 25 and 40, the actual value depending on the permeability of the article 1. Assuming that the article has a diameter of 0.375 inch, the appropriate length of each of the regions 2, 3 would lie in the approximate range 9–15 inches.

Apparatus suitable for including the magnetic regions 2, 3 is shown diagrammatically in FIGS. 2, 3 and 4.

The apparatus shown in FIG. 2 comprises a solenoid SOL energised from a D.C. source S via a double pole switch SW. In order to induce the regions 2, 3, the article 1 to be marked is passed through the solenoid, the current magnitude from the source S being such that a desired magnetising field, say 100 oersteds is produced. With the switch SW in position Y the article 1 is passed through the solenoid in the direction indicated by the arrow D in FIGS. 1A and 2, and as the point A, chosen as described above, leaves the solenoid the switch SW is moved to position X and the magnetic region 2 commences to be induced with the polarity as indicated in FIG. 1A, When the point B of the article 1 is on the point of leaving the solenoid, the D.C. energising current is reversed by moving the switch SW to position Z and the oppositely poled region 3 commences to be induced. As the point C enters the solenoid the D.C. energising current is switched off by returning the switch SW to position Y.

The apparatus shown in FIG. 3 comprises an electromagnet EM having pole pieces P and Q and energised from a D.C. source S via a double-poled switch SW. To induce the magnetic reigons 2 and 3, the article 1 is moved across the pole pieces P and Q, which are spaced apart in the direction of travel of the article, in the direction indicated by the arrow D in FIGS. 1A and 3. The distance between the pole pieces P and Q is made at least equal to the length of each of the regions 2 and 3. As the point B passes the pole piece P the electromagnet energising current is switched on by moving switch SW to position X and as the point B passes the pole piece Q the energising current is reversed by moving the switch SW to position Z, the switch being returned to position Y when the point C passes the pole piece Q.

As an alternative to the apparatus shown by FIG. 3, the apparatus shown in FIG. 4 may be used and the regions 2 and 3 induced simultaneously. The apparatus shown in FIG. 4 utilises two electromagnets EM1 and EM2 disposed adjacent each other in the direction of travel D of the article 1 past the pole pieces P and Q of the respective electromagnets. The electromagnets are connected in series to a D.C. source S via an on-off switch SW1 so that their next adjacent poles P are similarly poled. Thus only a single switching operation when the article 1 is in the required position relative to the pole pieces of the electromagnets is necessary. Instead of the two electromagnets EM1 and EM2 a pair of solenoids could be used in appropriate circumstances.

These latter two methods normally produce more sharply defined magnetic regions and are more suited to the marking of a continuously travelling ferromagnetic article. In all cases, the switching of the inducing field should be such that a rapid field build-up is obtained.

Apparatus as described above is suitable for marking defects in the seam of a co-axial cable as previously described, the apparatus for magnetising the cable being incorporated together with fault detection apparatus in machinery for effecting continuous manufacture of the cable. The apparatus may also be used for making marks on submarine cable for detection at sea, either with the cable on board the ship or when laid.

In order subsequently to detect points on the article 1 defined by the junction between the contiguous regions 2 and 3, the article 1 may be moved past means responsive to the longitudinal component of the magnetic regions 2 and 3 and capable of distinguishing the point at which that component passes through a zero value at the junction of the regions 2 and 3 from the points at which it passes through a zero value at the junction of those respective regions with unmagnetised regions of the article. Such apparatus employs amplitude limiting techniques followed by differentiation of the limited signal so that the direction of the longitudinal component is sensed thus enabling its passage through zero at the point 5 to be readily distinguished from the other points at which it passes through zero.

Alternatively, the article may be moved past means simultaneously and separately responsive to the longitudinal and radial components of the magnetised regions 2 and 3.

One form of this latter type of detection apparatus is shown in FIG. 5 and utilises two fluxgate magnetometers 10 and 20.

The magnetometer 10 has two saturable reactors 11 and 12 disposed side by side and wound with primary windings 13 and 14 respectively, in series opposing connection, and with secondary windings 15 and 16 respectively, in series aiding connection. The magnetometer 20 is similarly constructed, the components being denoted by references 21–26 corresponding with the components 11–16 of the magnetometer 10.

Each pair of primary windings 13, 14 and 23, 24 is connected across the output of an oscillator OSC, the secondary winding pair 15, 16 is connected to the input of a tuned amplifier AMP1 and the secondary winding pair 25, 26 is connected to the input of a tuned amplifier AMP2. The amplifiers AMP1 and AMP2 each are tuned to twice the frequency of the oscillator OSC and the respective coils of electromagnetic relays RL1 and RL2 are connected across the outputs of the respective ampilfiers AMP1 and AMP2. The relays have contacts RL1A and RL2A connected in series with a suitable alarm or indicator IND and an energising source ES. The relay circuit is so arranged that the device IND is operated when the magnetometer 10 detects a zero external magnetic field simultaneously with the magnetometer 20 detecting an external radial component of the magnetic field greater than a predetermined value chosen so that the magnetometer 10 does not respond to the negative lobes of the radial component of the magnetic field.

In use of the detection apparatus shown in FIG. 5, the article 1, on which respective pairs of magnetised regions 2, 3 have been formed as previously described, is moved past the detection apparatus, the magnetometer 10 being positioned with its sensitive axis parallel to the direction of travel of the article 1 so that it responds to the longitudinal components of the fields of the regions 2, 3 and the magnetometer 20 being positioned with its sensitive axis perpendicular to the direction of travel of the article 1 for response to the radial components of those regions. For accurate detection of the junction between the regions 2, 3 the magnetometers 10 and 20 should be positioned as closely as possible to the article 1. For example, when making measurements on a lightweight cable on to which the dielectric material has been extruded, as previously described, and with the magnetometers 10 and 20 positioned about 0.4–0.5 inch from the cable, it has been found possible to detect the junction to within an accuracy of about ±0.1 inch.

With the oscillator OSC operative, and in the absence of any external magnetic field, the voltage across the secondary winding pairs 15, 16 and 25, 26 differs from zero only in so far as the individual reactors of the pairs 11, 12 and 21, 22 are not identical with each other. In the presence of an external field to which a magnetometer responds, there is produced across the secondary winding pair of that magnetometer an alternating voltage having frequency at twice that of the oscillator OSC and a magnitude dependent on the external field.

Thus as the article 1 passes the magnetometers 10 and 20, the inputs to the respective amplifiers AMP1 and AMP2 will vary in dependence on the magnetic field of the part of the regions 2 and 3 passing the magnetometers. As the junction between the regions 2 and 3 passes the magnetometers, magnetometer 10 will generate zero voltage across its secondary winding pair 15, 16, since the longitudinal component of the magnetic field at the junction is zero, there will be zero input to the amplifier AMP1 and the relay RL1 will be unoperated and its contact RL1A closed. Simultaneously, the magnetometer 20 will respond to a maximum of the radial component of the magnetic field at the junction between regions 2 and 3 and consequently a corresponding voltage will be set up across the secondary winding pair 25, 26. The amplifier AMP2 is arranged to respond to this voltage and energise the relay RL2 to close the contact RL2A. Hence, the device IND will be actuated and either record the detection of the junction of two regions 2, 3 or provide a visual or audible indication of the detection of that junction. In addition, actuation of the device IND may be arranged to operate other control circuitry.

The magnetometers 10 and 20 are required to have a sensitivity which is sufficiently limited to ensure ready response to the zero flux condition to be detected. A form of construction suitable for use in the apparatus described with reference to FIG. 5 employs saturable reactors comprising Mumetal strips 7 cm. x 0.2 cm. x 0.03 cm. The primary and secondary windings each consist of 450 turns of 40 S.W.G. enamelled copper wire, wound in two layers, the secondary windings overlying the respective primary windings. The oscillator OSC was arranged to supply a primary current of 40 ma. at 400 c./s., and the amplifiers AMP1 and AMP2 tuned to 800 c./s. With this arrangement, the output voltages appearing across the secondary winding pairs of the magnetometers were found to vary in an approximately linear manner for external magnetic fields over the range ±40 oersteds.

FIG. 6 shows an alternative apparatus for detecting the junction between contiguous regions 2 and 3 of an article 1 and utilising Hall effect gaussmeters for simultaneous and separate detection of the longitudinal and radial components of the magnetised regions 2 and 3. The apparatus is similar to that described with reference to FIG. 5 except that the fluxgate magnetometers are replaced by Hall probes HP1 and HP2, each fed by respective oscillators OSC1 and OSC2. Each Hall probe has a sensitive element comprising a thin rectangular slab of semiconductor material, for example indium arsenide, and its associated oscillator feeds a current along the length of the element. In use of the apparatus, the probe HP1 is placed with the planes of its faces perpendicular to the length of the article 1 and the probe HP2 with the planes of its faces parallel to the length of the article 1. In the presence of a current flowing along the length of the element of a probe and a magnetic field perpendicular to the planes of its faces, a voltage proportional to both the current and the magnetic field is produced across the width of the slab. The voltages appearing across the widths of the elements of the probes HP1 and HP2 are fed to the amplifiers AMP1 and AMP2, respectively, for controlling the operation of relays RL1 and RL2 which control the operation of the indicator IND by the energising source ES, as previously described with reference to FIG. 5.

The magnetic fields associated with the regions 2 and 3 are relatively small and hence so is the voltage produced across the elements of the Hall probes. The use of the oscillators to supply the drive current to the probes enables A.C. amplifiers to be used for the amplifiers AMP1 and AMP 2 and thus difficulties of low-level D.C. amplification are avoided. Typically, the oscillators may supply a drive current of 100 ma. at a frequency of 1 kc./s., but the frequency is not critical.

The forms of detection apparatus described above are relatively simple and are very suitable for use in detection of magnetic marks, made in accordance with the invention, during manufacture of a submarine cable or other elongated ferromagnetic articles, when the detector can be positioned close to the cable and when there is close control over side effects, e.g. external magnetic fields, direction and speed of movement of the article, which might have undesired effects on the marking and subsequent detection. However, detection apparatus for ship-borne use, whilst of course using the principles of the apparatus described, will need modifications apparent to those skilled in the art in order to minimise and preferably eliminate unwanted side effects due to, for example, the earth's magnetic field, non-constant movements of the ship, and remoter location of the detector from the cable having the magnetic marks to be detected. A form of detector apparatus more particularly suited to ship-borne use is illustrated schematically in FIG. 7 and described below.

FIG. 7 shows in block schematic form only, a form of magnetic mark detection apparatus based upon detection of phase changes of the radial field component.

An oscillator OSC3 drives two fluxgate magnetometers FM1, FM2 whose construction and positioning with respect to the article 1 are similar to those of magnetometers 10 and 20 described above in connection with FIG. 5. The outputs of magnetometers FM1, FM2 are fed via band pass filters F1, F2 and amplifiers AMP1, AMP2 respectively to phase sensitive rectifiers PSR1 and PSR2. Oscillator OSC3 feeds demodulator R1 whose output is passed via band pass filter F3 and amplifier AMP3 to the phase sensitive rectifiers PSR1 and PSR2. Each phase sensitive rectifier thus has two inputs and gives a D.C. output whose magnitude and polarity depends on the relative phases of the two inputs.

Oscillator OSC3 produces an output signal of frequency $f_0$ whilst band pass filters F1, F2 and F3 all have a narrow pass band centered on $2f_0$.

When fluxgate magnetometers scan junction 5 (FIG. 1), the output from FM1 is zero and this is arranged to produce zero output from PSR1. At junction 5, the output from FM2 is of maximum magnitude and of a particular polarity and this produces at the output of PSR2 an output of large magnitude and of corresponding polarity. When the magnetometers scan regions 2 and 3 (FIG. 1) the output of FM1 and hence of PSR1 varies and is again zero at the junctions with the adjacent unmagnetised regions, where, however, that from FM2 is of maximum magnitude but of a polarity opposite to that produced at junction 5. Thus, at these junctions of regions 2 and 3 with the adjacent unmagnetised regions, the output of PSR2 is of large magnitude but the polarity of the output has reversed compared with that produced at junction 5.

Trigger T1 is arranged to respond to the input conditions presented to it from junction 5 but not to those presented from the junctions of regions 2 and 3 with the adjacent unmagnetised regions. Trigger T1 operates an indicator IND similar to those described above.

Detection of polarity changes in the output of the magnetometer responsive to radial field changes enables the junctions between regions 2 and 3 and the adjacent unmagnetised regions, i.e. points A and C, to be more readily distinguished from junction 5, i.e. point B.

The magnetic marks may be removed, if necessary, by passing the marked article through an alternating magnetic field having a peak amplitude equal to the field used to make the marks.

We claim:

1. A method of detectably marking an elongated ferromagnetic article at selected points along its length, which method comprises:

(a) selecting each point of the article to be marked, (b) inducing simultaneously, in the vicinity of the selected point and extending lengthwise of the article, two adjacent oppositely-directed magnetic regions which have components of external magnetic field which extend longitudinally and transversely of the article, (c) said simultaneously induced regions being of such length that the demagnetizing field produced by each region is small compared with the coercivity of the article, (d) the selected point being disposed between the adjacent like poles of the two simultaneously induced magnetic regions.

2. A method as claimed in claim 1, in which in step (b) the two magnetic regions are simultaneously induced by exposing the article to a composite magnetic field consisting of two serially adjacent magnetic fields each of which induces in the article one of said magnetic regions.

3. A method as claimed in claim 2, in which the composite magnetic field is made up of two magnetic fields simultaneously extending serially lengthwise of the article, adjacent poles of the two magnetic fields being of like polarity.

4. A method as claimed in claim 2, in which the two magnetic fields are generated electrically.

5. A method of detecting a magnetic mark induced by a method as claimed in claim 1, which method comprises:

(a) detecting the longitudinally extending component of the external field of the magnetic regions, (b) detecting the transversely extending component of the external field of the magnetic regions, and (c) comparing the so detected components to detect those points of the article at which the longitudinally extending component of external field is zero concurrently with a transversely extending component exceeding a predetermined value.

6. Apparatus for detecting a magnetic mark on a ferromagnetic article, said mark comprising two adjacent oppositely directed magnetic regions which extend lengthwise of the article, which are of such length that the demagnetizing field produced by each region is small compared with the coercivity of the article, and which have components of external field extending longitudinally and transversely of the article, said apparatus comprising, in combination:

(a) a first magnetometer responsive to longitudinally extending components of the external field of said magnetic regions, (b) a second magnetometer responsive to transversely extending components of the external field of said magnetic regions, and (c) means connected to said magnetometers for indicating the concurrence of a zero output from said first magnetometer with an output exceeding a predetermined value from said second magnetometer.

7. Apparatus as claimed in claim 6, in which the means connected to said magnetometers includes means for comparing the sign of the outputs of said magnetometers with a standard.

8. Apparatus as claimed in claim 7, in which the means for comparing the sign of the outputs of the magnetometers with a standard comprises, in combination:

(f) a reference source,
(g) a trigger device, and
(h) phase sensitive rectifiers connected to receive inputs from the respective magnetometers and from said reference source,
(i) said phase sensitive rectifiers having their outputs connected to the indicating means through said trigger device,
(j) said trigger device being responsive only to zero output from the rectifier connected to said first magnetometer simultaneously with an output from the rectifier connected to the second magnetometer.

9. Apparatus for detecting a magnetic mark on an article, said mark comprising two adjacent oppositely directed magnetic regions which extend lengthwise of the article, which are of such length that the demagnetizing field produced by each region is small compared with the coercivity of the article, and which have components of external field extending longitudinally and transversely of the article, said apparatus comprising, in combination:

(a) first and second magnetometers responsive respectively to longitudinally extending and transversely extending components, and
(b) first and second electromagnetic relays connected to said magnetometers and operable in response to the outputs of the first and second magnetometers respectively,
(c) said first and second relays each having a pair of contacts, the pair of contacts of one relay being open when the relay is energized, and the pair of contacts of the other relay being closed when the relay is energized, and
(d) an indicating means having a control circuit in which said pairs of contacts are connected in series.

10. Apparatus for detecting a magnetic mark on a ferromagnetic article, said mark comprising two adjacent oppositely directed magnetic regions which extend lengthwise of the article, which are of such length that the demagnetizing field produced by each region is small compared with the coercivity of the article, and which have components of external field extending longitudinally and transversely of the article, said apparatus comprising, in combination:

(a) a first Hall effect gaussmeter exposed to the longitudinally extending component of said external field,
(b) a second Hall effect gaussmeter exposed to the transversely-extending component of said external field, and
(c) means connected in said first and second gaussmeters for indicating the concurrence of a zero output from the first gaussmeter with an output from said second gaussmeter greater than a predetermined value.

11. Apparatus for detecting a magnetic mark on a ferromagnetic article, said mark comprising two adjacent oppositely directed magnetic regions which extend lengthwise of the article, which are of such length that the demagnetizing field produced by each region is small compared with the coercivity of the article, and which have components of external field extending longitudinally and transversely of the article, said apparatus comprising, in combination:

(a) first and second fluxgate magnetometers responsive respectively to the longitudinally-extending and transversely extending components of said external magnetic field,
(b) a reference source and first and second phase sensitive rectifiers connected to the first and second magnetometers respectively and to said reference source to compare the outputs of the magnetometers with the output of the reference source,
(c) an indicating means and a trigger device,
(d) said phase sensitive rectifiers having their outputs connected to the indicating means through said trigger device,
(e) said trigger device being responsive only to zero output from the rectifier connected to said first magnetometer simultaneously with an output from the rectifier connected to the second magnetometer indicative of a particular polarity of the transversely extending component of the external magnetic field in the vicinity of the adjacent like poles of the two magnetic regions defining the mark.

References Cited

UNITED STATES PATENTS

| | | | |
|---|---|---|---|
| 2,425,213 | 8/1947 | Sunstein | 179—100.2 |
| 2,679,620 | 5/1954 | Berry | 340—174.1 |
| 2,989,690 | 6/1961 | Cook | 340—174.1 |
| 3,017,496 | 1/1962 | Greene | 340—174.1 |
| 3,150,358 | 9/1964 | Newmann et al. | 340—174.1 |
| 3,189,880 | 6/1965 | Gratian | 179—100.2 |
| 3,263,031 | 7/1966 | Welsh | 340—174.1 |
| 3,290,487 | 12/1966 | Scott | 340—174.1 |
| 3,295,117 | 12/1966 | Ault et al. | 340—174.1 |
| 3,308,449 | 3/1967 | Uemura | 340—174.1 |

BERNARD KONICK, *Primary Examiner.*

V. P. CANNEY, *Assistant Examiner.*

U.S. Cl. X.R.

324—37